Nov. 4, 1952

I. M. COLBETH ET AL 2,616,908

CONTINUOUS PROCESS FOR SOLVENT EXTRACTION
OF CASTOR OIL FROM CASTOR SEED

Filed April 18, 1950

INVENTORS
Ivor M. Colbeth
James S. F. Carter
BY
Darby & Darby
ATTORNEYS

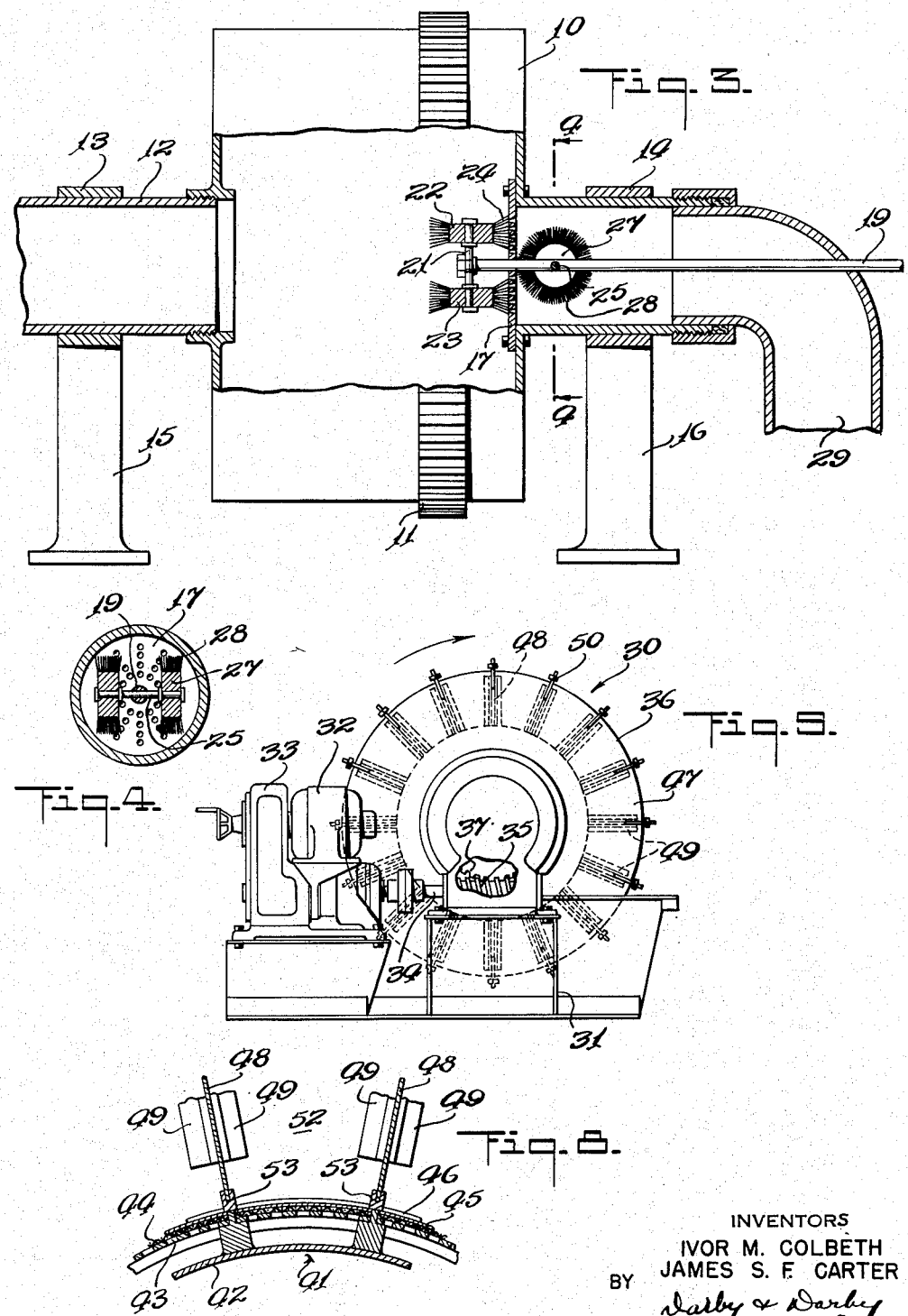

Nov. 4, 1952 — I. M. COLBETH ET AL — 2,616,908
CONTINUOUS PROCESS FOR SOLVENT EXTRACTION
OF CASTOR OIL FROM CASTOR SEED
Filed April 18, 1950 — 3 Sheets-Sheet 3

INVENTORS
IVOR M. COLBETH
JAMES S. F. CARTER
BY Darby & Darby
ATTORNEYS

Patented Nov. 4, 1952

2,616,908

UNITED STATES PATENT OFFICE 2,616,908

CONTINUOUS PROCESS FOR SOLVENT EXTRACTION OF CASTOR OIL FROM CASTOR SEED

Ivor M. Colbeth, Maplewood, N. J., and James S. F. Carter, Rockville Centre, N. Y., assignors to The Baker Castor Oil Company, Jersey City, N. J., a corporation of New Jersey Application April 18, 1950, Serial No. 156,702

8 Claims. (Cl. 260—412.4)

1

This invention provides a process for continuously extracting castor oil from castor seed with the aid of solvents. The process of this invention includes the following main steps: fine grinding of seed in a convenient mill in the presence of a solvent, while continuously charging and discharging the mill; converting the seed proteins to a non-gelatinous form; separation of the miscella from the pomace; and chilling treatment of the miscella to separate the oil from the major portion of the solvent.

Solvent extraction methods for obtaining fatty oils from oil-containing seeds are in use at the present time. These methods require: the use of bulky equipment, which could not be transported from place to place without being dismantled; the use of undesirably large amounts of solvents; and the expenditure of an undue amount of energy in connection with the separation of the solvent from the oil by evaporation. According to the instant invention, it is now possible to extract castor oil from castor seed in equipment which can be readily transported without being dismantled, by a simple method which requires the use of comparatively small quantities of solvent, and which provides for a substantial and impressive reduction in the energy requirements as compared with the energy required in any of the previously existing solvent extraction processes.

One of the novel features of this invention involves effecting the comminution of the seed in the presence of a volatile, substantially aliphatic hydrocarbon solvent. The seed may be comminuted by a convenient machine, for example, a high speed rotary comminuting machine employing rotating blades, or, as herein described, by a ball mill. The seed and solvent are charged to the mill continuously in any desired ratio, and the resulting slurry is continuously discharged from the mill. An advantage of this milling operation is that, as soon as fresh surfaces of the seed are exposed by the action of the balls, the solvent can act thereon immediately. The ensuing yield of oil is greater than if the solvent were not present during the comminution, since, if the solvent were absent during this operation, it would be difficult for the solvent subsequently to penetrate the resulting gelatinous mass. The presence of the solvent also aids in effecting the discharge of the comminuted seed from the mill. Further, if the temperature in the mill is over about 80° F., an additional advantage results, namely, there is a higher degree of extraction of the oil from the seed.

The present process may be practiced either with seed which has been decorticated or with seed in which the majority or all of the hulls remain associated with the solids of the feed material throughout the processing steps. It has been found that, when the seeds are initially substantially decorticated, the oil produced by the process of this invention has superior color, the free fatty acid content is greatly reduced, and the required filter area may be reduced by a factor of approximately one-half. When it is desired to operate the process with seed which has not been dehulled to a substantial extent, better filtration rates were accomplished due to the presence of the hull fragments; also there is a saving in time and energy requirements through omission of the decorticating step.

Another novel feature of this invention which permits operation in a continuous manner involves converting the seed proteins to a non-gelatinous form. This step can be effected by, e. g., heating the slurry of seed and solvent produced in the initial comminution step to a temperature in the range from about 150° to about 180° F. It has been found that heating of the slurry at the indicated temperature results in the conversion of the protein present in the seed into a granular form. As a result, the subsequent separation of solids (pomace) from the miscella by filtration can be readily and quickly effected in a continuous manner. If the slurry is not heated to the indicated temperatures, the protein remains in a slimy condition, and, thereby, renders any separation of the pomace from the miscella extremely difficult. If the slurry is heated to a temperature above the indicated range, the properties of the products formed by the process of this invention are adversely affected; e. g., undesirable discoloration of the oil results; also the solvent may be vaporized to an undesirable extent unless special equipment is provided.

One of the novel features of this invention, which enables the indicated profound reduction in energy requirements, involves cooling the filtrate (miscella) to a temperature below 50° F. but above the temperature at which the oil crystallizes from the miscella, whereby separation of the filtrate into two layers is obtained. The upper layer is low in oil content, whereas the lower layer is rich in oil. The upper layer is recirculated to the extraction system. The solvent is stripped from the lower layer, e. g., by steam distillation, and the desired castor oil is collected as a residue.

A typical practical working procedure for processing castor seed according to the process of this invention is presented in the following example, although it is to be understood that the invention is not limited to the procedure of the example.

Referring to the accompanying drawings, illustrative embodiments of the invention are shown as follows:

Figure 3 is a cross section of the ball mill with associated cleaning device;

Figure 4 is a cross section taken along the line 4—4 of Figure 3;

Figure 5 is an elevation, partly in cross section, of a rotary hopper dewaterer or rotary compartment suction filter;

Figure 8 is a detail of a portion of the dewaterer showing a fragmentary view of the filter drum with associated compartments;

Figure 1:
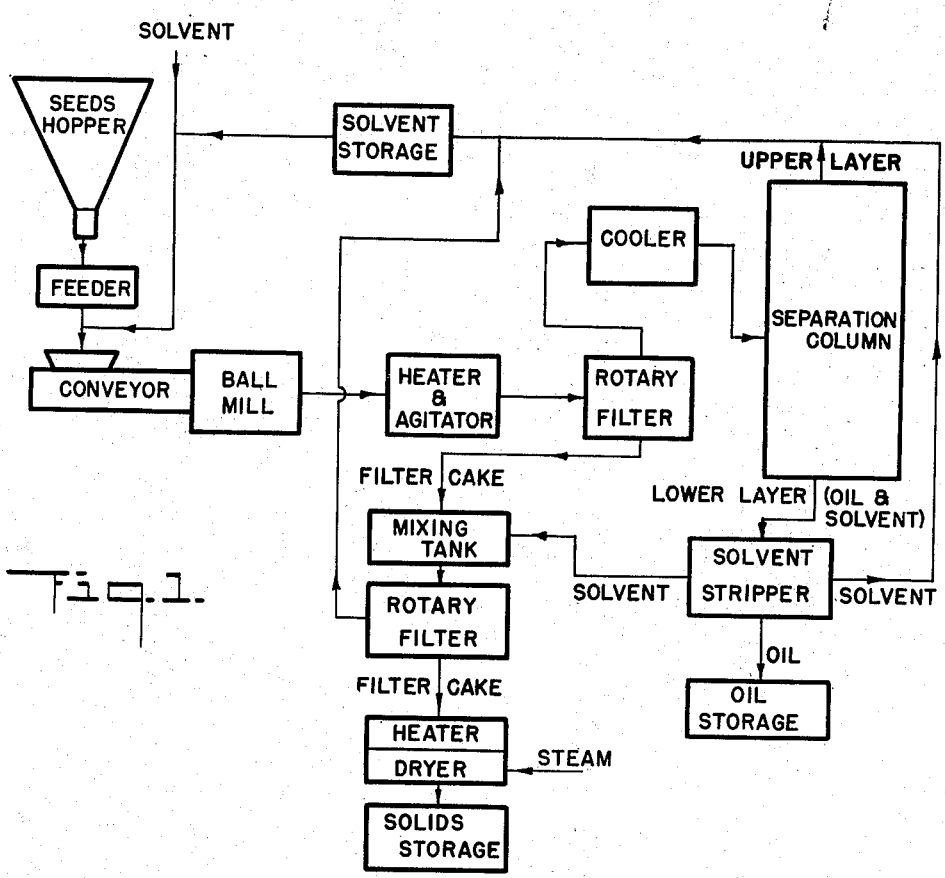
Figure 1 is a flow sheet diagram of the essential steps in the process, including conventional illustration of the apparatus.

Referring to Figure 1, as explained above, the seeds are introduced from a feeder together with solvent onto a conveyor which is preferably of the screw type. The mixture of seeds and solvent is fed into the ball mill, after which it is directed into a heater and agitator and thence to a rotary filter to be described later in more detail. The filtrate leaves the rotary filter and is passed through a cooler into a separation column or decanter wherein an upper layer and a lower layer are separated. The upper layer consists primarily of a solvent with a small amount of oil and is fed back to the solvent storage tank preferably after a further distillation stage for purification of the solvent. The lower layer within the separation column, which consists of relatively high concentration of oil in the solvent, is fed to a solvent stripper whence part of the solvent is redirected back into the initial stage of the cycle, i. e. via solvent storage. Another portion of the solvent is fed to the mixing tank wherein it is mixed with the filter cake from the rotary filter. After further contacting of solvent with the filter cake, the mixture is introduced into a second rotary filter whence the solvent with relatively small percentage of oil is fed back into the solvent storage tank again preferably after a distillation stage for purification. The residual cake from the second rotary filter is fed into a heater and a dryer, and, after steaming, is deposited in a solids storage container. The oil from the solvent stripper is collected in an oil storage tank.

Figure 2:
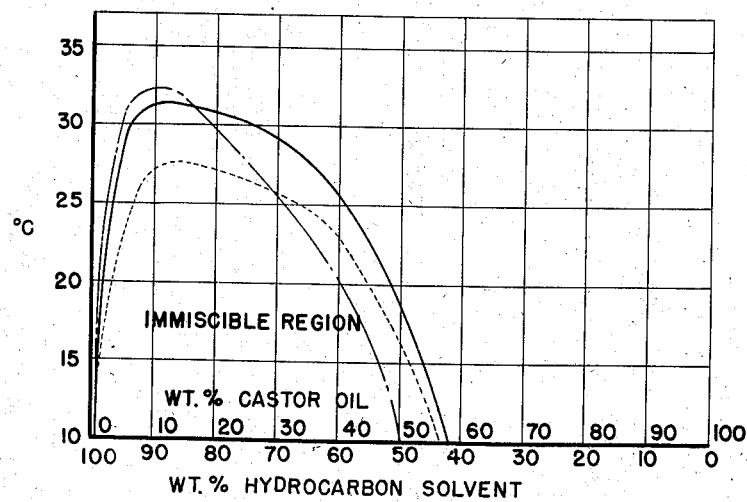
Figure 2 is a chart showing the miscibility relationship between castor oil and various hydrocarbon solvents at various concentrations and temperatures.

Referring to Figure 2, the curve shows the range of temperatures in degrees centigrade below which castor oil becomes immiscible with various hydrocarbon solvents, depending upon the relative concentration by weight of castor oil to hydrocarbon solvent. The solid curve is for heptane; the dotted curve is for hexane; and the dot-dash curve is for naphtha having a distillation range between about 150° F. and 280° F. For example, it is apparent that at temperatures above about 29° C., 30% by weight of castor oil in 70% by weight of heptane produces a compatible or miscible mixture, whereas below about 29° C. the same solution divides into two layers, the upper layer comprising primarily heptane and the lower layer comprising primarily castor oil.

Referring to Figure 3, a typical ball mill having a drum 10 is driven by suitable drive means in communication with ring gear 11 secured to the drum. Input pipe 12 preferably has a screw conveyor (not shown) for insuring constant feed of the seed-solvent mixture into the ball mill. Trunnions 13 and 14 are supported on uprights 15 and 16, respectively, and the outlet plate 17 of the ball mill is perforated, the size of the perforations being such that insufficiently ground seed is retained, the minimum diameter of the perforations being between one-quarter and three-eighths inch. A fixed shaft 19 terminates inside the ball mill drum 10 and supports a shaft 21 upon which a pair of rotary brushes 22, 23 may rotate, as the bristles 24 contact the rotating plate 17. A transverse shaft 25 is mounted on fixed shaft 19 outside the ball mill drum 10 and holds at its ends another pair of shafts, one shown at 26, upon which a brush 27 rotates, its bristles 28 being in contact with the exterior of the plate 17. Rotation of the drum, and hence of the plate 17, frictionally drives the cleaning brushes, thereby preventing clogging of the perforations in the plate 17. It is to be noted that the perforations in the plate are preferably flaring in the direction of flow, which results in more rapid passage of the miscella and solids out of the ball mill. The mixture emerges through the delivery pipe 28 and then into the heater and agitator (see Figure 1).

Figures 5–10 illustrate the rotary dewaterer 30 which is supported by frame 31 and driven by a motor 32 with appropriate reduction gear 33 which drives shaft 34 (see Figure 5) having a worm pinion gear 35 which drives the assembly 36 by a rotary rack 37.

Figure 6:
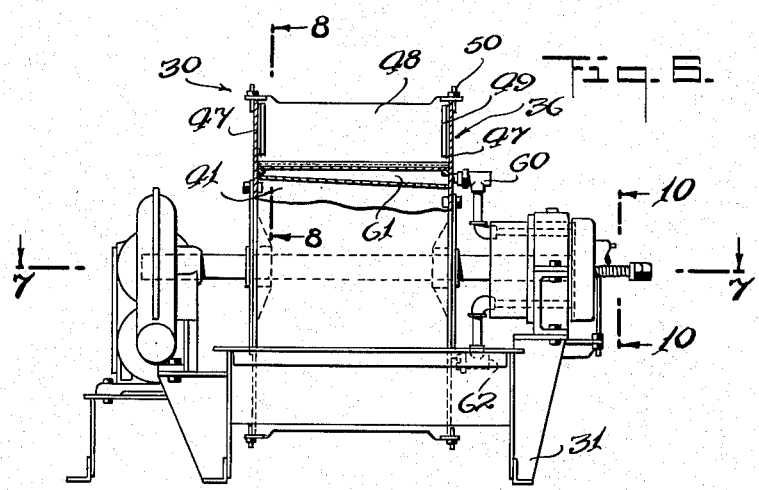
Figure 6 is a vertical cross section of the apparatus shown in Figure 5.
Figures 7, 10:
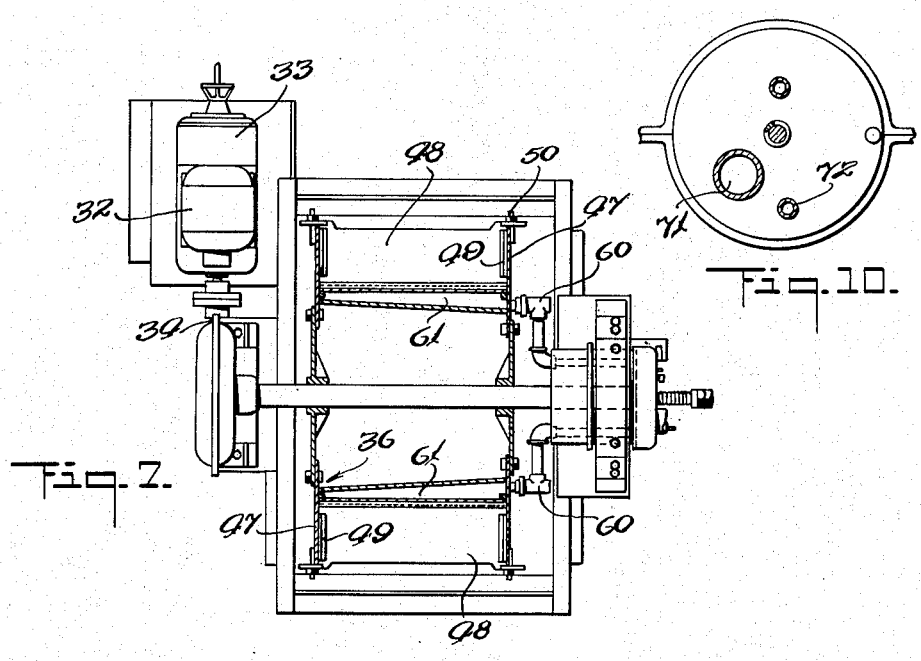
Figure 7 is a horizontal cross section taken along the line 7—7 of Figure 6.
Figure 10 is an end elevation view, partly in section, taken along the line 10—10 of Figure 6.
Figure 9:
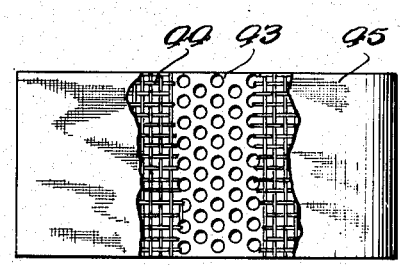
Figure 9 is a fragmentary view of various layers of the filter drum.

The dewaterer 30 is a more or less conventional rotary drum filter, with the usual internal suction means. The filter drum 41 has a frame 42 supporting a rigid perforated cylinder 43 over which is preferably superposed in contact therewith a backing screen 44 on which is superposed a filter cloth 45. Retaining ring 46 is provided to hold the filter assembly in rigid position around the filter drum. Referring especially to Figures 6 and 7, the rotating assembly 36 includes end plates 47 which project considerably beyond the periphery of the filter drum 41 to provide walls for compartments extending radially from the drum. The compartments are further separated from each other by baffle plates 48 which are held in position by angle-bar guides 49 supported by end plates 47 and which are locked by bolts 50 secured to the end plates 47. As may be seen from Figure 8, each compartment 52 is separated from its adjacent compartment by the partition plates or baffles 48 which preferably fit into grooves in resilient sealing members 53 below the guides 49.

The mixture to be filtered is introduced onto the top portion of the dewaterer 30 as shown in Figure 6, and as the assembly 36 rotates, the material does not roll off the filter cloth 45 during travel over the upper segment of rotation of the filter, since it is held in the compartments 52 by the baffle plates. Suction is applied through pipes 60 to withdraw the filtrate from the mixture into compartments 61, each of which corresponds to the compartments 52 outside the filter drum. As the filter assembly 36 rotates, so that the pipe 60 communicating with an individual compartment approaches the lowermost position in its path of travel as shown at 61, a conventional valve arrangement disconnects the pipe 60 from the suction line and connects it to a gas pressure pipe line (preferably an inert gas such as nitrogen) for blowing the filter cake out of the respective compartments 52 as they travel over the lower portion of their cycle. The operation, thus, of the rotary filter 30 is that during the upper portion of the cycle, the filter compartments 61 are under reduced pressure, thereby removing the filtrate from the mixture through the filter elements associated with the drum 30. As the compartment rotates past the horizontal position, and approaches its lowermost position, gas pressure is increased considerably above atmospheric in the compartment 61 and the filter cake is blown off of the drum, thereby releasing that segment of the drum for a new charge of slurry when it has reattained feeding position at the upper section of its cycle of travel.

Figure 10 shows the filtrate exit pipe 71, and blow pipe 72 which are successively connected to the respective pipes 60 in conventional fashion.

The arrangement of the filter in the present process has proved especially effective in carrying out the process of the present invention.

EXAMPLE

In this example, the process for extracting castor oil from castor seed is described on the basis of a pilot plant set-up handling 1 ton of castor seed in 24 hours. Castor seed, in general, contains approximately 25% hull, 25% protein-bearing material, and about 50% oil.

Castor seed is deposited in a hopper, and is withdrawn at a uniform rate by means of an automatic scale feeder. The amount of seed so withdrawn can be adjusted to any suitable rate of flow to the processing unit. The rate of withdrawal used in this instance is 82 lbs. of castor seed per hour, the seed being delivered by the moving belt of the feeder to a screw conveyor which transfers the seed to a steel ball mill. This transfer may be direct, or the seed may be decorticated prior to feeding into the ball mill. Power consumption is reduced by omitting the decortication step, but when this intermediate step is included, the color of the final oil product is improved, and the free flow of solid and liquid components through the system is enhanced in that there is a markedly reduced tendency for solids to separate by gravity in the lines.

A simultaneous charge to the ball mill is a paraffinic petroleum naphtha (bus naphtha), which is fed in at the rate of 1.3 gallons per minute (or 468 lbs. per hour); this rate is measured by the use of a rotameter. The naphtha, which has a distillation range of from 150° to 280° F., acts as the extracting solvent.

The ball mill runs continuously. The charge of balls occupies a volume which is approximately one-eighth of the total volume of the ball mill. The balls used are approximately from 2 to 3 inches in diameter, and are made of non-sparking, ceramic material such as porcelain. The ball mill being used has an internal diameter of 60 inches and an internal length of 48 inches, and is operated preferably about at room temperature or slightly higher. The ball mill is so constructed that the feed (castor seed and solvent) enters it via a trunnion (the hollow shaft of which may act as a support for the ball mill) at one end of its axis. The ground slurry or pulp is discharged through a similar opening at the other end of the axis.

In the ball mill, the seed is ground (this being the primary function of the ball mill), and the castor oil is simultaneously extracted to some extent by the naphtha. A suitable degree of fineness of grind is about 20 mesh, that is, the particles are about $\frac{1}{20}$ to about $\frac{1}{16}$ of an inch in diameter. For ease of subsequent processing, it is desirable that the castor seed should not be ground any finer than about 20 mesh in the ball mill. If the seed particles are, on the average, finer than the indicated lower size limit, the filter used in the subsequent filtration of the slurry containing the fine particles tends to become clogged, and the resulting pomace is dusty and inconvenient to handle.

The slurry, which is discharged from the ball mill, flows from the mill to a holding tank which is supplied with a steam coil and an agitator, and which is sufficiently large to afford a holding time of at least about 30 minutes. The slurry is heated in this tank to a temperature of about 160° to about 170° F., and is stirred constantly so as to maintain the solids in suspension. At this elevated temperature, the protein content of the seed is denatured and, thereby, the ensuing filtration proceeds smoothly. There is no loss of solvent during this heating step as provision is made for the condensation of solvent vapors. The slurry is removed from this tank by means of a helical screw-type pump having a positive displacement action and is then delivered to a rotary type filter, wherein the liquids are separated from the solids (pomace).

The rotary type filter, which has a filter area of about 18 square feet, separates the miscella from the pomace. The resulting filtrate consists of about 447 lbs. of naphtha and 41 lbs. of castor oil per hour, and in the same period, the filter cake amounts to approximately 41 lbs. of pomace, 21 lbs. of residual naphtha, and 4 lbs. of castor oil.

The filtrate is run to a surge tank, and is then pumped through a water-cooled heat exchanger. The filtrate is subsequently cooled to a temperature of about 32° F. by passing it through a second heat exchanger which is refrigerated with a fluorinated, gaseous hydrocarbon, e. g. Freon.

From the cooling operation, which results in layer separation, the naphtha and oil are pumped to a gravity separator. The upper layer, which consists principally of naphtha, is decanted and returned to the solvent system for the purpose of recirculation through the process. The lower layer is drawn from the separator and consists, per hour, of approximately 38 lbs. of naphtha and 40 lbs. of castor oil in a homogeneous mixture. This solution is then pumped through a series of heaters to a steam stripping column, where the naphtha is stripped from the castor oil; the oil is drawn off from the bottom of the tower to a product tank. The stripping operation is essentially a steam distillation. The tower overhead passes to a condenser and then to a separator, where the stripping steam is condensed and separated. The pure recovered naphtha is dropped to a surge tank, from which it is pumped to the recovered solvent storage tank or to a mixing tank in which the initial filter cake is reslurried. The hourly yield of oil from the separating tower is approximately 40 lbs.

Advantageous results accrue if, prior to this distillation step, the castor oil is subjected to a refining treatment while in solution in the gasoline. In this case, the viscosity of the oil is reduced by the presence of the solvent, rather than by an increase in temperature; this is important, since the adsorption isotherm is not affected as much by the temperature as by the degree of dispersion of the constituents to be removed by the refining treatment. The refining treatment consists of acid and/or color removal. Acid removal can be accomplished readily by continuously contacting the oil solution with, e. g., sodium hydroxide solution, in a continuous neutralizer as disclosed in Colbeth U. S. Patent 2,183,486. Color removal can be effected by contacting the oil solution with suitable bleaching and filtering media, such as the acid-activated bleaching earths prepared from montmorillonite, e. g., "Neutrol" and "Filtrol"—products of the Filtrol Corporation, adsorptive clays consisting of hydrated aluminum and magnesium silicates, e. g., fuller's earth, and activated carbons, e. g., "Darco"—a product of the Darco Company. The earths or clays are suitably used in the amount of 2% per 100 lbs. of castor oil present, while the carbon black is advantageously used simultaneously in the amount of 0.5% on the same basis.

An enormous advantage as regards the color of the oil results from this bleaching of the castor oil in solution. Further color improvement can be achieved by decortication of the seed and separation of the hulls prior to subjecting the seed meats to the extraction operation.

The filter cake from the rotary filter is deposited in a small mixing tank, where it is reslurried with solvent recovered from the stripping column. The final extraction of the oil occurs in this tank, the oil content of the pomace thus being reduced from about 8 to 10% to about 1%. The fresh slurry is then sent to a second rotary filter, having a filter area of about 12 square feet; the resulting filtrate is pumped to the used slovent tank for recirculation to the ball mill.

Steam may be applied to the second filter in order to drive off residual solvent from the filter cake. The cake is then discharged from the filter and sent to the storage hopper. If it is desired to remove the last traces of solvent from the filter cake, the latter is passed through a dryer, into which open steam is introduced, before being sent to storage. The heat treatment of the pomace, to steam off solvents at this stage, or to effect the coagulation of the proteins earlier in the process, results in the detoxification of the pomace, so that it becomes suitable for use as a source of proteins in prepared animal feeds.

OPERATING CONDITIONS

Comminution

One of the important features of the ball mill operation is the continuous flow of the castor seed to the mill. There was originally some difficulty observed in getting the seed through the long trunnion into the ball mill. An aluminum screw conveyor which turns with the mill and draws the seed from the entrance point through the trunnion provides a satisfactory solution to this difficulty. However, care must be taken that the liquid level in the mill is not so high that the seed will float in the naphtha and out of reach of the screw conveyor. As regards the seed itself, it is advantageous to solvent-wash and dry it before it is ball milled.

Originally, a perforated plate was placed at the exit of the ball mill in order to retain insufficiently ground seed in the mill. This perforated plate clogged easily as the pomace in slurry form has a tendency to bridge over the openings. A somewhat unsatisfactory solution consisted in placing a ¼ inch mesh screen at an angle in the discharge pipe leading from the mill. An alternative arrangement, which proved to be completely satisfactory, involves the use of a perforated plate in the exit line of the ball mill, the surfaces of this plate being kept clean by the action of two cylindrical brushes, these brushes being fixedly mounted with respect to the axis of the mill so as to come in contact with both surfaces of the plate as the plate rotates with mill rotation. These brushes were made of pig bristle, and were arranged to clean the plate during rotation of the mill and were permitted to rotate on their own axes. No discharge difficulties are observed with this arrangement.

Extracting solvent

The solvent used in the extracting and comminuting operation is preferably of the saturated, acyclic hydrocarbon type. It has been found that the presence of aromatic or other cyclic hydrocarbons in the solvent cause the extraction of color bodies from the seed to an undesirable extent. Further, the presence of cyclic hydrocarbons in the solvent prevents or retards the separation of the miscella into two layers in the cooling operation. The naphtha used in the illustrative example is a mixture of heptane, octane, and nonane. The use of paraffinic hydrocarbons boiling lower than 60° C., as solvent, requires maintenance of pressure in the system in order to reach the temperatures at which the proteins in the seed are denatured or coagulated. However, such hydrocarbons, including propane, may be used as the extraction solvent where it is feasible to maintain the entire extraction system under pressure. The use of excessively high boiling hydrocarbons (e. g. boiling point over about 250° C.) is not desirable, since they could not be separated as readily as the preferred solvent from the oil in the steam stripping operation. Also, high boiling solvents are difficult to remove completely from the pomace in the drier. Individual hydrocarbons such as hexane, heptane and octane, may be used, but there is an economic advantage to using mixtures of such hydrocarbons boiling within the desired range. In choosing a naphtha, it should be borne in mind that the lower boiling naphthas have less solvent power for the castor oil at low temperatures than do the higher boiling naphthas. Consequently, it is preferable to use the lower boiling naphthas in the present process from the standpoint of the better separation of oil that can be effected thereby in the cooling operation.

In connection with the denaturation of the protein, the use of heat for the denaturation may be supplanted by the use of chemicals in the process of the present invention. For this purpose, chemicals, such as formaldehyde, tannic acid, acetic acid, mineral acids and heavy metal salts, are effective. Lead salts are the preferred heavy metal compounds, since their use causes no discoloration of the oil or protein.

The proportion of solvent to seed is, in the illustrative example, about 5 to 1, on a weight basis. This is not necessarily the optimum relationship, as less solvent would have to be handled and recovered if the proportion were 3 to 1 or 2 to 1. However, the use of solvent in the proportion indicated in the illustrative example provides a slurry which is fluid enough to be readily handled, and concentrated enough so that the separation effected in the chilling step is an economical operation.

*Filtration and other process steps*

It is important to provide a proper pump to handle the slurry which is discharged from the comminuting machine or mill. A continuous screw-type pump, which has small discharge lines to give fairly high velocity, has proven to be eminently suitable for moving this slurry. Open impeller centrifugal pumps may also be used when high capacities are involved.

There are two steps involved in the filtration of the slurry discharged from the heating tank, and both steps presented complicated engineering problems. The first step involves separating the miscella from the solid constituents of the slurry by means of a filter. In this connection, it was found that the pomace settles out of the naphtha at a very fast rate, and, in order to prevent clogging of the lines, it was found to be advantageous to provide effective agitation in the heating tank and to pump the slurry through the lines at a rapid rate. The filtration of the slurry is also greatly benefited by the treatment in the heating tank, since this heat treatment prevents the coating of the filters with a slimy deposit during the filtration operation. The actual filtration is effected in a continuous manner by the use of a rotary vacuum filter, such as the compartment type herein described.

The rotary hopper or rotary compartment vacuum dewaterer is a rotary type filter having compartments mounted on its rim. Its operation comprises dropping the slurry into the compartments at the top of the drum cycle. The solvent is drawn into the drum of the filter by means of the vacuum; and the compartment walls serve to prevent the solid particles from dropping from the drum until the solvent has been so removed. When a compartment reaches the bottom of the drum cycle, the deposited filter cake drops or is blown out into a suitable receptacle. The compartment then returns to the top position, where it is refilled with slurry. A refinement which permits great flexibility in the use of this comprises discharging the compartments through separate lines, thereby enabling segregation of different fractions of the filtrate. Alternatively, if desired under particular circumstances, the separation of the pomace from the miscella may be effected by the use of a mechanical classifier, or by decantation (gravity), instead of by filtration.

The particular rotary filter herein described has a number of definite advantages over other types of filters, such as centrifugal filters. For example, the herein described filter preferred for use in the present process permits removal of all fines so that subsequent processing equipment does not become clogged. This is of particular importance in continuously operating the process.

Particularly satisfactory results were obtained when the filter cloth 45 was a single layer of heavy nylon cloth having approximately 34,000 openings per square inch, and a backing layer comprising a 100-mesh screen directly supported the fine mesh nylon cloth. With this particular type of arrangement of filter cloth, a 20-mesh screen was satisfactory for the layer 44. This arrangement gave a perfectly clear filtrate.

The desirable effect of heating the slurry may be attributed to coagulation of the protein present in the pomace. In the case of the illustrative example presented herein, the denaturing is carried out in a tank which has about a 50 gallon capacity and will retain the slurry for at least about 30 minutes. The treatment of the slurry at about 150°–160° F. is effected while the slurry is being agitated. The indicated temperature range has been found to be the preferable range for this heat treatment.

The second step in the filtration operation involves washing adhering miscella from the meal before the latter is dropped from the filter compartment, fresh solvent being used for this purpose. The effluent from this washing operation is collected separately from the straight miscella, this being possible through the use of a separate discharge line for the washing operation.

An alternative procedure consists in reducing the oil content of the pomace by washing the same with alcohol instead of with the hydrocarbon solvent used in the main extraction operation. An additional fraction thus obtained contains lecithin, and is highly desirable for use as an antioxidant, as a wetting or emulsifying agent, as a lubricant in the processing of leather, as an ingredient of paper sizing, of soap stock, or of fat-liquoring compositions, and the like.

In the cooling operation, the temperature to which the miscella is chilled, for proper layer separation, should be below 50° F., preferably below 41° F., but above the temperature at which the oil crystallizes from the miscella. When relatively large amounts of water are present in the system it is desirable that the temperature not be lowered below 32° F. so as to prevent the water from freezing. However, the presence of water in the system is not normal, and, consequently, economic considerations will determine the temperature to which the miscella is cooled in a particular case. Castor oil crystallizes at about 0° F.; but, in the case of the castor oil-gasoline miscella, crystallization of the oil occurs well below 0° F., the exact temperature depending on the relative amounts of castor oil and gasoline present. The temperature of the misclla may be reduced to these low temperatures, without recourse to the heat exchange units, by applying a vacuum to the miscella; a prerequisite for this procedure is that the miscella contain adequate amounts of a low-boiling component.

In general, the oil content of the lower layer of the miscella obtained from the cooling operation is about 50–55%, with the gasoline content being about 50–45%. The oil content of the upper layer of this miscella ranges less than about 3%; the usual range for the oil content of the upper layer is 0.5–1.0%.

The seed hulls may be separated from the rest of the filter cake by a flotation process. The separated hull material is an important and useful abrasive.

One of the advantages of the process of this invention is that the seed proceeds through the solvent extraction equipment at a rapid rate. Even so, it is important that the seed should have a minimal moisture content, as otherwise objectionable amounts of fatty acids and glycerin are formed during the extraction operation. It is also desirable to incorporate inhibiting agents for the seed enzymes at the comminution step of the process; tannins are among the suitable inhibiting (coagulating) agents for the enzymes.

*Advantages of the process*

The advantages of the present process include: compactness and portability; low power consumption; small amounts of solvent required; the small amount of material which is being processed at any one time; improved processing with lower costs through replacement of prior art steps of hydraulic pressing, solvent extraction, and refining with one continuous operation.

It has not previously been possible to construct a unit for the extraction of castor seed and the like which could be readily transported in operating condition to the various geographical centers at which the materials to be subjected to the process of this invention are produced. Equipment suitable for carrying out the process of this invention can be installed for example, on a trailer truck, railway car, or a small boat. Various factors cooperate to make possible the small, readily transportable extraction unit of this invention. Thus, the quantity of solvent required is comparatively small. The filtering arrangement and the heating unit are small. The heat requirement is low, so that ordinary small steam boilers can be used. Also, the rapid throughput of seed, together with the small amount of seed being processed at any one time, enable the use of a small extraction unit.

Prior art processes for the production of castor oil involve the use of hydraulic pressing equipment, which is not adapted to continuous operation, and requires a considerable amount of manual manipulation. While solvent extraction has been used in the prior art, the novel and economical chilling method of this invention for separating castor oil from the solvent has not hitherto been available. And the advantages which accrue from refining in solution according to the process of this invention, namely improved oil color, reduced fatty acid content of the oil, and ease of refining at relatively low or room temperature as opposed to the elevated temperatures required by the prior art, serve to increase the benefits which can be derived from operating according to the process of this invention. It can readily be appreciated that the combination of the several steps of the present invention into one continuous operation requiring a minimum operating staff provides a highly useful and novel process for the production of castor oil from castor seed.

One of the important advantages of the present process is the low expenditure of energy necessary for the separation of solvent from the oil. The following hypothetical case will exemplify the principles involved. Assume a mixture which contains 10% of castor oil and 90% of gasoline at a temperature of 100° F. If the mixture is cooled to 30° F., the resulting upper layer would contain 0.15% castor oil and 99.85% gasoline, while the lower layer would contain 53% castor oil and 47% gasoline.

Assume further that it is desired to separate castor oil from 10% solution of castor oil and gasoline, by a prior process involving distillation only. Assume commencement with 10,000 pounds of a mixture consisting of 9,000 pounds of gasoline and 1,000 pounds of castor oil and that the temperature of this mixture is 100° G. The following facts are required for the necessary calculations: the specific heat of castor oil is 0.514 and that of the gasoline is 0.529; the average boiling point of the gasoline is 220° F., and its latent heat of vaporization is 133 B. t. u per pound.

The first calculation will be to determine the heat needed to distill the gasoline from the mixture in order to recover the castor oil. The mixture will have to be heated from 100° F. to 220° F. The heating will be continued until all of the gasoline evaporates. Let A equal the B. t. u. required to raise the mixture to the boiling point of the gasoline, and let B equal the B. t. u. required to evaporate the gasoline. The sum of A and B will, therefore, represent the total heat required to distill the gasoline expressed in B. t. u.

Calculation of A $A = W \times S \times T$ where $W$ = Weight of each component of the mixture.
$S$ = Specific heat of each component.
$T$ = The difference between the temperature of the gasoline entering the still and its average boiling point.

$A = a' + a''$
$a'$ = Heat to raise castor oil to 220° F. = $W_{oil} \times S_{oil} \times T$
$a''$ = Heat to raise gasoline to 220° F. = $W_{gas} \times S_{gas} \times T$
$a' = 1000 \times .514 \times (220-100) = 61,680$
$a'' = 9000 \times .529 \times (220-100) = 571,300$
$A = 61,680 + 571,300 = 632,980$ B. t. u.

Calculation of B $B$ = Wt. of gasoline × latent heat of vaporization.
$B = 9,000 \times 133 = 1,197,000$ B. t. u.
$A + B = 632,980 + 1,197,000 = 1,829,980$ The total B. t. u. for the distillation of the gasoline is, therefore, 1,829,980 B. t. u.

Since each pound of steam (the source of heat for the distillation) condensed yields 1000 B. t. u., 1,839,980 B. t. u. would be the equivalent of 1,830 pounds of steam. Then, with the cost of steam currently averaging $1.00 per 1000 lbs. the cost of steam for this particular distillation would be $$\frac{1,829,980 \times 1.00}{1000 \times 1000} = \$1.83$$

By way of contrast, consider the amount of energy needed to separate the gasoline from the castor oil by the process of this invention. According to the invention, 10,000 pounds of the mixture would be cooled from 100° F. ($T_1$) to 30° F. ($T_0$). The amount of the lower layer would consist of 1886 pounds which would contain 886 pounds of residual gasoline and 1000 pounds of oil. The residual gasoline would, of course, have to be removed by distillation. Incidentally, no mention of the respective requirements for stripping steam is made in this comparison of the previous and present processes for the separation of castor oil from the miscella. This factor was not introduced into the calculations because of the equivalence of the two processes in this particular regard.

The calculation of the energy needed can be made in three steps:

$C$ = The amount of refrigeration needed.
$D$ = The heat needed to distill the residual gasoline.
$E$ = The heat needed to raise the chilled upper layer to the extraction temperature, so that this recovered gasoline can be recirculated through the process.

Calculation of C $C$ = Wt. of mixture $(T_1-T_0)$ sp. heat
$= 1,000 \times .514 \times (100-30) + 9,000 \times .529 \times (100-30)$
$= 369,280$ B. t. u.

Calculation of D

D = The amount of heat necessary to distill the residual gasoline. This can be divided into two steps, F and G.

F = The heat necessary to raise the mixture to the boiling point.

G = The heat necessary to evaporate the residual gasoline.

F = Wt. of mixture × temp. rise × sp. heat.

F = 1000 × .514 × (220−30) + 886 × .529 × (220−30)
= 186,710 B. t. u.

G = 886 × 133 = 117,840 B. t. u.

D = F + G
= 186,710 + 117,840 = 304,550 B. t. u.

Calculation of E

E = Heat to raise gasoline from 30° to 100° F.
= Wt. of gasoline × sp. heat × temp. rise
= 8114 × .529 × (100−30)
= 300,470 B. t. u.

The cost of the refrigeration can be determined on the basis of the current charge of 1.35 cents per kilowatt hour (this being equivalent to 12,000 B. t. u. per hour), as follows:

$$\frac{369{,}280 \times \$.0135}{12{,}000} = \$0.42$$

The cost of steps D and E can be calculated in the same manner as the cost of the all-distillation process. Thus, D + E = 304,550 + 300,470 = 605,020 B. t. u.

And using the same steam cost, we obtain as the cost of these steps:

$$\frac{605{,}020 \times \$1.00}{1000 \times 1000} = \$0.61$$

The total cost of the chilling process is, then:

$$\$0.42 + 0.61 = \$1.03$$

In summary, the old method would cost $1.83 for each 10,000 pounds of the gasoline-castor oil mixture handled, while the method of this invention would cost $1.03 on the same basis. In other words, the total cost of the old method (as per this example) is 78% greater than that of the method of the present invention.

The process of this invention turns out a large yield of oil per unit of time, and this is one of the factors which permits the design of extraction units which have only a small amount of material being processed at any one time. In previous processes, prolonged contact and heating of the seed with the solvent were required. However, the finely ground seed used in the present process permits ready contact of the seed with the solvent, and consequently rapid solution of the oil in the solvent. Thus, the problems encountered with the leaching operation in previous processes are completely obviated in the process of the present invention.

What is claimed is:

1. A continuous process for the manufacture of castor oil by the solvent extraction of castor seed, comprising the steps of: (a) comminuting the seed in the presence of a volatile, substantially aliphatic hydrocarbon solvent to form a slurry, (b) converting the seed proteins to a non-gelatinous form, (c) separating the miscella from the solids by thickening and compacting the solids of the slurry on one surface of a perforate filtering element while subjecting the slurry to suction applied to the opposite surface of said element to produce a substantially solids-free miscella and rotating said element on a horizontal axis, (d) cooling the miscella to a temperature at which it separates into two layers, (e) separating the lower layer from the upper layer of the cooled miscella, and (f) recovering the castor oil, which constitutes at least about 50% of the lower layer, from the solvent of said layer by distillation.

2. The process of claim 1, in which step (b) comprises heating the slurry consisting of comminuted seed and solvent in a holding vessel at a temperature of from about 150° to about 180° F.

3. The process of claim 1, in which step (b) is effected by the use of a coagulating agent for proteins.

4. The process of claim 1, in which step (c) is effected in a series of compartments.

5. The process of claim 1, in which the temperature attained by the miscella during step (d) is below 41° F. but above the temperature at which the oil crystallizes.

6. The process of claim 1, in which the upper layer from step (e) is introduced in step (a) as solvent.

7. A continuous process for the manufacture of castor oil by the solvent extraction of castor seed, comprising the steps of: (a) comminuting the seed in the presence of volatile, substantially aliphatic hydrocarbon solvent to form a slurry, (b) retaining the resulting slurry in a holding tank at a temperature of from about 160° to about 170° F. for at least 30 minutes to complete the extraction of the oil and to convert the seed proteins to a non-gelatinous form, while agitating the tank contents, (c) separating the miscella from the solids by thickening and compacting the solids of the slurry on one surface of a perforate filtering element while subjecting the slurry to suction applied to the opposite surface of said element to produce a substantially solids-free miscella and rotating said element on a horizontal axis, (d) cooling the miscella to a temperature at which it separates into two layers, (e) separating the lower layer from the upper layer of the cooled miscella by gravity, (f) recycling the solvent-rich upper layer to step (a), (g) passing the lower layer, which contains at least about 50% of castor oil, through a series of heat exchangers to a steam stripping column, where the solvent is separated from the oil by steam distillation, (h) passing the solvent-free oil into a storage tank, and (i) condensing the distillate, separating the water layer from the solvent layer by decantation, and collecting the solvent in a recovered solvent tank.

8. The process of claim 1, in which, during step (c), said solids are contacted with additional solvent in order to free said solids from residual amounts of castor oil.

IVOR M. COLBETH.
JAMES S. F. CARTER.

REFERENCES CITED

The following references are of record in the file of this patent:

UNITED STATES PATENTS

| Number | Name | Date |
|---|---|---|
| 2,467,403 | Pascal | Apr. 19, 1949 |
| 2,502,484 | Saunders | Apr. 4, 1950 |